United States Patent Office 3,115,495
Patented Dec. 24, 1963

3,115,495
CERTAIN 3,4-DIARYL-$\Delta^2$-1,2,5-THIADIAZOLINE-
1,1-DIOXIDES AND THEIR PREPARATION
John B. Wright, Kalamazoo Township, Kalamazoo
County, Mich., assignor to The Upjohn Company,
Kalamazoo, Mich., a corporation of Delaware
No Drawing. Filed May 13, 1963, Ser. No. 280,114
9 Claims. (Cl. 260—301)

This invention pertains to novel organic compounds and to a process for preparing the same. More particularly, the invention is directed to novel 3,4-disubstituted-$\Delta^2$-1,2,5-thiadiazoline-1,1-dioxides, and to a process for preparing them.

The novel compounds of the invention can be represented by the following structural formula:

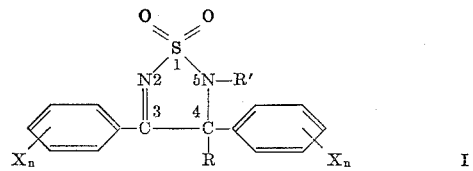

wherein X is selected from the group consisting of lower-alkyl of from 1 to 4 carbon atoms, inclusive, lower-alkoxy of from 1 to 4 carbon atoms, inclusive, and halogen; $n$ is an integer from 0 to 4, inclusive; R is selected from the group consisting of hydrogen and lower-alkyl of from 1 to 4 carbon atoms, inclusive; and R' is selected from the group consisting of hydrogen, lower-alkyl, and lower-alkanoyl of from 2 to 4 carbon atoms, inclusive.

In accordance with this invention, the term "lower-alkyl of from 1 to 4 carbon atoms, inclusive" includes methyl, ethyl, propyl, butyl, and isomeric forms thereof. Similarly, the term "lower-alkoxy of from 1 to 4 carbon atoms, inclusive," includes methoxy, ethoxy, propoxy, butoxy, and isomeric forms thereof. "Halogen" includes chlorine, bromine, iodine, and fluorine. The term "lower-alkanoyl of from 2 to 4 carbon atoms, inclusive," includes acetyl, propionyl, butyryl, and isobutyryl.

The novel compounds of this invention (compounds of Formula I, above) are useful as intermediates. Illustratively, the compounds of Formula I wherein R' is hydrogen can be reacted with chlorine to produce active-chlorine compounds in which the N-attached hydrogen atom at position 5 is replaced by a chlorine atom. Furthermore, compounds of Formula I can be catalytically hydrogenated in the presence of a hydrogenation catalyst, e.g., platinum or palladium, to obtain the corresponding 3,4 - disubstituted-1,2,5-thiadiazolidine-1,1-dioxides of the formula:

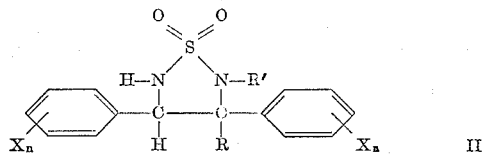

wherein R, R', X, and $n$ are as defined above. The compounds of Formula II are then reacted with chlorine to produce active-chlorine compounds in which one or two N-attached hydrogen atoms are replaced by chlorine. The degree of chlorination (whether one or two atoms of chlorine) depends upon the identity of R' (whether hydrogen, lower-alkyl, or lower-alkanoyl) as well as whether chlorination is effected with one molecular equivalent of chlorine or with two molecular equivalents. The aforesaid active-chlorine compounds are useful as disinfectants, bleaching agents, and antiseptics. Moreover, the novel compounds of Formula I wherein R' is hydrogen are local anti-inflammatory agents and can be used for treating cuts, burns, abrasions, and contusions in mammals, birds, and other animals.

The novel compounds of Formula I wherein R' is hydrogen and lower-alkyl are prepared by condensing a sulfamide of the formula

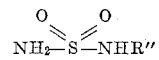

wherein R" is selected from the group consisting of hydrogen and lower-alkyl, with a benzoin of the formula:

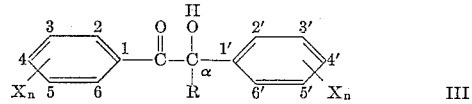

wherein R, X, and $n$ are as defined above. The reactants are mixed in the presence of an inert organic solvent and acid catalyst. Suitable inert organic solvents include methanol, ethanol, isopropyl alcohol, ethanol and water, dioxane, dimethylformamide, dioxane and water, dimethylformamide and water, and the like. Suitable acid catalysts include, for example, hydrogen chloride, sulfuric acid, p-toluenesulfonic acid, hydrogen bromide, and the like. The reaction proceeds satisfactorily at temperatures ranging from about 20° C. up to about 100 C., and, advantageously, the reaction mixture is heated at a temperature in the range of about 60° C. up to about 100° C. in order to assure completion of the reaction in a convenient interval of time. The 3,4-disubstituted-$\Delta^2$-1,2,5-thiadiazoline-1,1-dioxide thus produced is separated from the reaction mixture and recovered in pure form by conventional procedures such as filtration, solvent evaporation, solvent extraction, and crystallization.

Alternatively, the novel compounds of Formula I wherein R' is lower-alkyl can be conveniently prepared by condensing sulfamide with a benzoin of Formula III and reacting the thus-produced 3,4-disubstituted-$\Delta^2$-1,2,5-thiadiazoline-1,1-dioxide (compound according to Formula I wherein R' is hydrogen) with a diazoalkane, e.g., diazomethane, diazoethane, diazopropane, and diazobutane, to produce the corresponding 5-alkyl-3,4-disubstituted-$\Delta^2$-1,2,5-thiadiazoline-1,1-dioxide. The reaction of a 3,4-disubstituted-$\Delta^2$-1,2,5-thiadiazoline-1,1-dioxide with a diazoalkane (preferably an ethereal solution thereof) is conveniently effected at temperatures ranging between about 10° C. and about 30° C. in the presence of an inert solvent such as methylene chloride, chloroform, carbon tetrachloride, and the like.

The novel compounds of Formula I wherein R' is lower-alkanoyl are conveniently prepared by condensing sulfamide with a benzoin of Formula III and reacting the thus-produced 3,4-disubstituted-$\Delta^2$1,2,5-thiadiazoline-1,1-dioxide (compound according to Formula I wherein R' is hydrogen) with a lower-alkanoyl halide, preferably a lower-alkanoyl chloride, e.g., acetyl chloride, propionyl chloride, butyryl chloride, and the like.

The benzoin starting compounds having the Formula III are generally known in the art and can be prepared by known methods. Illustrative known benzoins include benzoin, α-butylbenzoin,
5,5'-dibromo-2,2'-dimethoxybenzoin,
3,3'-dibromo-2,2',4,4',6,6'-hexamethylbenzoin,
4,4'-dibromo-2,2',6,6'-tetramethylbenzoin,
2,2'-diethoxybenzoin,
2,2'-dimethoxybenzoin,
4,4'-dimethoxybenzoin,
α-ethyl-4,4'-dimethoxybenzoin,
4,4'-diisopropylbenzoin,
p-toluoin (4,4'-dimethylbenzoin),
2,4,4'-trimethylbenzoin, α-ethylbenzoin,
2,2',4,4',6,6'-hexaethylbenzoin,
2,2',4,4',6,6'-hexaisopropylbenzoin,
2,2',4,4',6,6'-hexamethoxybenzoin,
3,3',4,4',5,5'-hexamethoxybenzoin,
2,2',4,4',6,6'-hexamethylbenzoin,
4-methoxybenzoin,
4'-methoxybenzoin,
α-methylbenzoin,
2,2',3,3',5,5',6,6'-octamethylbenzoin,
2,2',4,4',6-pentamethylbenzoin,
2,2',5,5'-tetramethoxybenzoin,
2,2',6,6'-tetramethylbenzoin,
2,3,4,6-tetramethylbenzoin,
2,4,4',6-tetramethylbenzoin,
2,4,6-triisopropylbenzoin,
2,4,6-trimethylbenzoin,
2',4',6'-trimethylbenzoin,
4-chlorobenzoin,
4'-chlorobenzoin,
4'-chloro-4-methoxybenzoin,
α-tert-butylbenzoin,
2,2'-dichlorobenzoin,
4,4'-dichlorobenzoin,
2,4-dimethoxybenzoin,
4-ethoxy-2-methoxybenzoin,
2-methoxy-2'-methylbenzoin,
4'-methylbenzoin,
2,3',4,4',6-pentamethoxybenzoin,
3,3',4,4'-tetramethoxybenzoin,
2,3',4,4'-tetramethoxybenzoin,
2,4,4',6-tetramethoxybenzoin,
2,4,4'-trimethoxybenzoin,
2,4,6-trimethoxybenzoin,
2,2'-dimethoxy-4,4'-dichlorobenzoin,
4-butoxybenzoin,
4-ethylbenzoin,
4-methylbenzoin,
4,4'-dibromobenzoin,
3-bromobenzoin,
2'-chloro-3,4-diethoxybenzoin,
2-ethoxybenzoin,
2'-ethoxybenzoin,
3'-chloro-4-methoxybenzoin, and
2,2'-dichloro-3,3'-dimethoxybenzoin.

The following examples are illustrative of the process and products of the present invention, but are not to be construed as limiting.

*Example 1.—Preparation of 3,4-Diphenyl-Δ²-1,2,5-Thiadiazoline-1,1-Dioxide*

A mixture consisting of 127.2 g. (0.6 mole) of benzoin and 57.6 g. (0.6 mole) of sulfamide in 600 ml. of absolute ethanol was treated with anhydrous hydrogen chloride gas with rapid stirring until the temperature of the mixture reached 50° C. The reaction mixture was then heated at the reflux temperature for 4 hrs. and concentrated under reduced pressure. The residue was mixed with water and extracted with ether. The ether extract was dried over anhydrous magnesium sulfate and the ether was evaporated. The residue was recrystallized from a mixture of 1 part ethanol and 1 part cyclohexane to give 103 g. (63% yield) of 3,4-diphenyl-Δ²-1,2,5 - thiadiazoline - 1,1 - dioxide as colorless needles melting at 132° to 135° C. A second recrystallization from the same solvent mixture raised the melting point to 136° to 137° C.

This compound, when tested in rats, was found to have anti-inflammatory activity.

*Analysis.*—Calcd. for $C_{14}H_{12}N_2O_2S$: N, 10.29; S, 11.77. Found: N, 10.05; S, 11.44.

*Example 2.—Preparation of 3,4-Di-(p-Tolyl)-Δ²-1,2,5-Thiadiazoline-1,1-Dioxide*

Following the procedure of Example 1, but substituting p-toluoin for benzoin and recrystallizing from a mixture of 1 part benzene and 3 parts cyclohexane, there was obtained 3,4-di-(p-tolyl)-Δ²-1,2,5-thiadiazoline - 1,1-dioxide as colorless prisms melting at 72° to 75° C. (with decomposition).

This compound, when tested in rats, was found to be active as an anti-inflammatory agent.

*Analysis.*—Calcd. for $C_{16}H_{16}N_2O_2S$: C, 63.98; H, 5.37; N, 9.33; S, 10.67. Found: C, 64.54; H, 5.21; N, 9.40; S, 10.84.

*Example 3.—Preparation of 5-Acetyl-3,4-Diphenyl-Δ²-1,2,5-Thiadiazoline-1,1-Dioxide*

A mixture consisting of 5.45 g. (0.02 mole) of 3,4-diphenyl-Δ²-1,2,5-thiadiazoline-1,1 - dioxide (Example 1, above) and 15 ml. of acetyl chloride was heated at the reflux temperature for 1 hr. The excess acetyl chloride was then removed by distillation under reduced pressure. The crude 5-acetyl-3,4-diphenyl-Δ²-1,2,5-thiadiazoline-1,1-dioxide thus obtained was triturated with ethanol, recovered on a filter, and recrystallized from ethyl acetate to give 5.76 g. (92% yield) of 5-acetyl-3,4-diphenyl-Δ²-1,2,5-thiadiazoline - 1,1 - dioxide as colorless crystals melting at 170° to 171° C.

*Analysis.*—Calcd. for $C_{16}H_{14}N_2O_3S$: C, 61.13; H, 4.49; N, 8.91; S, 10.20. Found: C, 61.35; H, 4.62; N, 8.78; S, 10.03.

Following the same procedure, but substituting propionyl chloride, butyryl chloride, and isobutyryl chloride for acetyl chloride, there were prepared 5-propionyl-3,4-diphenyl-Δ²-1,2,5-thiadiazoline-1,1-dioxide, 5-butyryl-3,4-diphenyl-Δ²-1,2,5-thiadiazoline-1,1-dioxide, and 5 - isobutyryl-3,4-diphenyl-Δ²-1,2,5-thiadiazoline-1,1 - dioxide, respectively.

*Example 4.—Preparation of 5-Methyl-3,4-Dipheny-Δ²-1,2,5-Thiadiazoline-1,1-Dioxide*

A solution of 3.20 g. (0.0117 mole) of 3,4-diphenyl-Δ²-1,2,5-thiadiazoline-1,1-dioxide (Example 1, above) in 50 ml. of methylene chloride was mixed with an ethereal solution of diazomethane. After the reaction mixture had been held at about 25° C. for 1 hr., the excess diazomethane was destroyed by addition of acetic acid and the solvent was evaporated. The residue was recrystallized from ethanol. There was thus obtained 1.41 g. of 5 methyl-3,4-diphenyl-Δ²-1,2,5-thiadiazoline-1,1 - dioxide as yellow prisms melting at 158° to 160° C.

*Analysis.*—Calcd. for $C_{15}H_{14}N_2O_2S$: C, 62.92; H, 4.93; N, 9.79; S, 11.20. Found: C, 62.87; H, 4.87; N, 9.54; S, 11.06.

Following the same procedure, but substituting diazoethane, diazopropane, and diazobutane for diazomethane, there were prepared 5-ethyl-3,4-diphenyl-Δ²-1,2,5-thiadiazoline-1,1-dioxide, 5-propyl-3,4-diphenyl-Δ² - 1,2,5 - thiadiazoline-1,1-dioxide, and 5-butyl-3,4diphenyl - Δ²-1,2,5-thiadiazoline-1,1-dioxide, respectively.

*Example 5.—Preparation of 5-Butyl-3,4-Diphenyl-Δ²-1,2,5-Thiadiazoline-1,1-Dioxide*

A mixture consisting of 5.53 g. (0.0363 mole) of butylsulfamide and 7.70 g. (0.0363 mole) of benzoin in 40 ml. of anhydrous ethanol was treated with hydrogen chloride gas until the temperature of the reaction mixture had increased to about 50° to 60° C. After heating at the reflux temperature for 2½ hrs., the ethanol was evaporated on a steam bath under reduced pressure. The residue thus obtained was diluted with water and the aqueous mixture was extracted several times with ether. The ether extracts were combined, dried over anhydrous magnesium sulfate, and the ether was evaporated. After recrystallizing the residue from ethanol, there was obtained 4.43 g. of 5-butyl-3,4-diphenyl-Δ²-1,2,5-thiadiazoline-1,1-dioxide as long colorless prisms melting at 132.5° to 134° C.

*Analysis.*—Calcd. for $C_{18}H_{20}N_2O_2S$: C, 65.84; H, 6.14;

N, 8.53; S, 9.75. Found: C, 65.78; H, 6.15; N, 8.22; S, 9.77.

Following the same procedure but substituting methylsulfamide, ethylsulfamide, and propylsulfamide for butylsulfamide, there were obtained 5-methyl-3,4-diphenyl-$\Delta^2$-1,2,5-thiadiazoline-1,1-dioxide,
5-ethyl-3,4-diphenyl-$\Delta^2$-1,2,5-thiadiazoline-1,1-dioxide, and 5-propyl-3,4-diphenyl-$\Delta^2$-1,2,5-thiadiazoline-1,1-dioxide, respectively.

*Example 6*

Following the procedure of Example 1, but substituting 5,5'-dibromo-2,2'-dimethoxybenzoin,
2,2'-diethoxybenzoin,
4,4'-dimethoxybenzoin,
4,4'-diisopropylbenzoin,
α,4,4'-trimethylbenzoin,
α-methylbenzoin,
2,2',4,4',6,6'-hexamethoxybenzoin,
4-methoxybenzoin,
2,2',3,3',5,5',6,6'-octamethylbenzoin,
2,4,6-trimethylbenzoin,
2',4',6'-trimethylbenzoin,
α-tert-butylbenzoin,
4-butoxybenzoin,
2,2'-dichlorobenzoin,
4-ethoxy-2-methoxybenzoin,
2-methoxy-2'-methylbenzoin,
3-bromobenzoin, and 2'-chloro-3,4-diethoxybenzoin for benzoin, there were prepared 3,4-di-(5-bromo-2-methoxyphenyl)-$\Delta^2$-1,2,5-thiadiazoline-1,1-dioxide,
3,4-di-(2-ethoxyphenyl)-,
3,4-di-(4-methoxyphenyl)-,
3,4-di-(4-isopropylphenyl)-,
4-methyl-3,4-di-(4-methylphenyl)-,
4-methyl-3,4-diphenyl-,
3,4-di-(2,4,6-trimethoxyphenyl)-,
4-phenyl-3-(4-methoxyphenyl)-,
3,4-di-(2,3,5,6-tetramethylphenyl)-,
4-phenyl-3-(2,4,6-trimethylphenyl)-,
4-(2,4,6-trimethylphenyl)-3-phenyl-,
4-tert-butyl-3,4-diphenyl-,
4-phenyl-3-(4-butoxyphenyl)-,
3,4-di-(2-chlorophenyl)-,
4-phenyl-3-(4-ethoxy-2-methoxyphenyl),
4-(2-methylphenyl)-3-(2-methoxyphenyl)-,
4-phenyl-3-(3-bromophenyl)-, and
4 (2-chlorophenyl)-3-(3,4-diethoxyphenyl)-$\Delta^2$-1,2,5-thiadiazoline-1,1-dioxides, respectively.

*Example 7*

5-chloro-3,4-diphenyl-$\Delta^2$-1,2,5-thiadiazoline-1,1-dioxide can be prepared according to the following procedure:

A solution of 27.2 g. (0.1 mole) of 3,4-diphenyl-$\Delta^2$-1,2,5-thiadiazoline-1,1-dioxide (Example 1, above) in 300 ml. of dry chloroform is treated with chlorine gas at a temperature of about 0° C. to 5° C. until the theoretical amount (7.1 g.; 0.1 mole) has been absorbed. The solvent is then removed at about 25° C. under reduced pressure, to obtain 5-chloro-3,4-diphenyl-$\Delta^2$-1,2,5-thiadiazoline-1,1-dioxide as a residue.

I claim:

1. 3,4-disubstituted-$\Delta^2$-1,2,5-thiadiazoline-1,1-dioxide of the formula

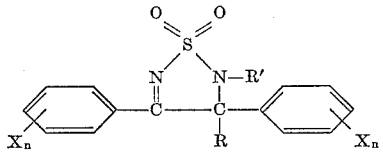

wherein R is selected from the group consisting of hydrogen and lower-alkyl; R' is selected from the group consisting of hydrogen, lower-alkyl, and lower-alkanoyl; X is selected from the group consisting of lower-alkyl, lower-alkoxy, and halogen; and $n$ is an integer from 0 to 4, inclusive.

2. 3,4-diphenyl-$\Delta^2$-1,2,5-thiadiazoline-1,1-dioxide.
3. 3,4 - di - (lower - alkylphenyl) - $\Delta^2$ - 1,2,5 - thiadiazoline-1,1-dioxide.
4. 3,4-di-(p-tolyl)-$\Delta^2$-1,2,5-thiadiazoline-1,1-dioxide.
5. 5 - lower - alkyl - 3,4 - diphenyl - $\Delta^2$ - 1,2,5 - thiadiazoline-1,1-dioxide.
6. 5 - methyl - 3,4 - diphenyl - $\Delta^2$ - 1,2,5 - thiadiazoline-1,1-dioxide.
7. 5 - butyl - 3,4 - diphenyl - $\Delta^2$ - 1,2,5 - thiadiazoline-1,1-dioxide.
8. 5 - acetyl - 3,4-diphenyl - $\Delta^2$ - 1,2,5 - thiadiazoline-1,1-dioxide.
9. The process which comprises reacting a compound having the formula

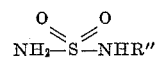

wherein R'' is selected from the group consisting of hydrogen and lower-alkyl with a benzoin of the formula

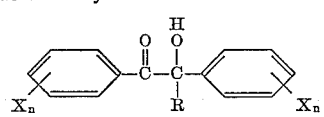

wherein R is selected from the group consisting of hydrogen and lower-alkyl; X is selected from the group consisting of lower-alkyl, lower-alkoxy, and halogen; and $n$ is an integer from 0 to 4, inclusive, to produce a 3,4-disubstituted-$\Delta^2$-1,2,5-thiadiazoline-1,1-dioxide of the formula

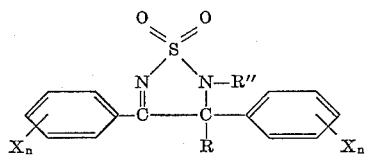

wherein R, R'', X, and $n$ are as defined above.

No references cited.